United States Patent
Hjelm et al.

(10) Patent No.: US 9,420,047 B2
(45) Date of Patent: Aug. 16, 2016

(54) METHOD AND APPARATUS FOR ENABLING USER SERVICES IN COMMUNICATION NETWORK

(75) Inventors: Johan Hjelm, Tokyo (JP); Theo Gerrit Kanter, Rönninge (NL); Mattias Lidström, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1231 days.

(21) Appl. No.: 12/525,549
(22) PCT Filed: Feb. 19, 2008
(86) PCT No.: PCT/SE2008/000132
  § 371 (c)(1),
  (2), (4) Date: Aug. 2, 2009
(87) PCT Pub. No.: WO2008/103103
  PCT Pub. Date: Aug. 28, 2008

(65) Prior Publication Data
  US 2009/0319613 A1    Dec. 24, 2009

Related U.S. Application Data

(60) Provisional application No. 60/890,534, filed on Feb. 19, 2007.

(51) Int. Cl.
  G06F 15/16    (2006.01)
  H04L 29/08    (2006.01)
  H04L 29/06    (2006.01)

(52) U.S. Cl.
  CPC ............ H04L 67/16 (2013.01); H04L 67/025 (2013.01); H04L 67/1008 (2013.01); H04L 67/1044 (2013.01); H04L 67/1061 (2013.01); H04L 67/303 (2013.01); H04L 69/24 (2013.01)

(58) Field of Classification Search
  CPC ............ H04L 67/025; H04L 67/1008; H04L 67/1044; H04L 67/1061
  USPC ........................................................ 709/204
  See application file for complete search history.

(56) References Cited

U.S. PATENT DOCUMENTS

2003/0091001 A1* 5/2003 Watanabe .................. 370/236
2004/0249942 A1* 12/2004 Chatterjee .......... H04L 41/5054
                                                                   709/225

(Continued)

FOREIGN PATENT DOCUMENTS

EP    1217787 A2    6/2002
EP    1677462 A1    7/2006

(Continued)

OTHER PUBLICATIONS

PCT International Search Report, mailed Aug. 29, 2008, in connection with International Application No. PCT/SE2008/000132.

(Continued)

Primary Examiner — Oleg Survillo
(74) Attorney, Agent, or Firm — Patent Portfolio Builders PLLC (57) ABSTRACT

A method and apparatus for enabling user services in a communication network with a plurality of terminal users. An initiating user terminal (200) executes a group discovery process with the terminals (202) to form a user group. Capabilities are exchanged with the terminals, including at least one of: functional resources, available services, equipment information, applications or data programs, and current traffic or connection characteristics When a group service request (R) is received from a user terminal (D) in the group, functions and actions required for the requested service are assigned to functional resources in the terminals based on the exchanged terminal capabilities. The requested group service can then be consumed by means of these functional resources without involving an operator controlled group management server.

22 Claims, 4 Drawing Sheets

(56) References Cited

U.S. PATENT DOCUMENTS

| | | | |
|---|---|---|---|
| 2005/0037708 A1 | 2/2005 | Torvinen | |
| 2005/0113123 A1 | 5/2005 | Torvinen | |
| 2005/0289509 A1* | 12/2005 | Illowsky | G06F 1/3203 717/107 |
| 2006/0126599 A1* | 6/2006 | Tarn | 370/352 |
| 2006/0179143 A1 | 8/2006 | Walker et al. | |
| 2007/0127686 A1 | 6/2007 | Song et al. | |
| 2008/0155523 A1* | 6/2008 | Kornmann | 717/168 |
| 2009/0265473 A1* | 10/2009 | Hydrie et al. | 709/229 |
| 2010/0030734 A1* | 2/2010 | Chunilal | 707/3 |
| 2011/0161421 A1* | 6/2011 | Lowery et al. | 709/204 |
| 2011/0252078 A1* | 10/2011 | Walker et al. | 709/201 |
| 2011/0302257 A1* | 12/2011 | Asher | 709/206 |

FOREIGN PATENT DOCUMENTS

| | | |
|---|---|---|
| EP | 1898570 A1 | 3/2008 |
| WO | 2006/115442 A1 | 11/2006 |

OTHER PUBLICATIONS

PCT Preliminary Report on Patentability, completed Jan. 20, 2009, in connection with International Application No. PCT/SE2008/000132.

EPO, Extended European Search Report in EP08712723, Oct. 17, 2013.

* cited by examiner

METHOD AND APPARATUS FOR ENABLING USER SERVICES IN COMMUNICATION NETWORK

TECHNICAL FIELD

The present invention relates generally to a method and apparatus for enabling user services in a group of terminal users in a communication network.

BACKGROUND

With the emergence of 3G mobile telephony, new packet-based communication technologies using IP (Internet Protocol) have been developed to support communication between users with multimedia services. A multitude of different mobile and fixed terminals capable of multimedia communication are also emerging on the market. New services involving communication of various types of media are also constantly being developed for terminal users to increase the field of usage for their communication terminals. In this description, the term "user services" generally represents any type of services that can be activated and consumed by means of a communication terminal.

Recently, solutions have been devised for creating and offering relevant and potentially attractive services to different service consumers according to their interests and needs in different situations. These user services can thus be adapted to the individual users depending on their user profiles and/or current situation.

A server called PGM (Presence and Group Management) has been defined by OMA (Open Mobile Alliance), which is configured to manage groups of users and adapt various user services to the characteristics of these user groups. A common group profile can be defined in the PGM server which can be aggregated from the user profiles of the individual group members. Further, WO 06/115442 discloses a mechanism where the particular needs of a user group can be met by providing relevant context information that has been adapted to particular interests and needs of the group.

Group management mechanisms can be defined and implemented for each user service when needed. For example, group management mechanisms are defined in the PGM server for the service called PoC (Push-to-talk over Cellular). These mechanisms generally specify a common message language and communication protocol between applications and servers, which are used as the service is consumed by the users in the group.

A process called "discovery" can be conducted when a user group is formed, involving the exchange of identities, terminal capabilities and available services within the group members, to enable communication between the users. The discovery process can also be conducted within a temporarily formed ad-hoc network of users, e.g. using Bluetooth communication. Specific service discovery protocols have been standardised for finding users and their services in the discovery process. However, the service discovery protocols are either network-specific or dependent on the lookup of a directory service.

The currently available group service solutions are thus always controlled by a central server or the like, e.g. the PGM server, which resides in an operator-controlled access or service network such as an IMS (IP Multimedia Subsystem) network. However, the users themselves have typically very limited options to create and influence their user services since the network operator controls the group services centrally. Further, creating and managing a group with members having network subscriptions with different operators is somewhat complicated and results in additional problems and constraints, as agreements and signalling across the networks are then required.

Another problem is that even though many types of terminals with different capabilities are available on the market, a terminal user may sometimes suffer from the limitations of his/her chosen terminal and/or current connection when desiring to consume certain user services. For example, the used terminal may have a high quality camera function but the user's subscription or current connection may only allow for a relatively low bitrate and/or accessibility for certain desirable user services. In another example, a terminal may have an excellent screen with high resolution but only mediocre sound reproduction, and so forth.

SUMMARY

It is an object of the present invention to address at least some of the problems outlined above. It is thus an object to improve the provision of different user services to a group of users in a communication network. This object and others are achieved primarily by providing a method and arrangement in an initiating user terminal for enabling user services in a communication network with a plurality of terminal users.

In the inventive method, the initiating user terminal executes a group discovery process with the terminals of the users in order to form a user group. Terminal capabilities are then exchanged with the terminals, including at least one of: functional resources, available services, equipment information, applications or data programs, and current traffic or connection characteristics. When a group service request is received from a user in the group, functions and actions required for the requested service are assigned to functional resources in the terminals based on the exchanged terminal capabilities, for consuming the requested group service by means of the functional resources.

The inventive arrangement comprises a group management function unit that includes a group discovery unit adapted to execute a group discovery process with the users' terminals to form a user group, and a capabilities exchange unit adapted to exchange terminal capabilities with the terminals, the terminal capabilities including at least one of: functional resources, available services, equipment information, applications or data programs, and current traffic or connection characteristics. The group management function unit also includes a request receiving unit adapted to receive a group service request from a user in the group, and a function assigning unit adapted to assign functions and actions required for the requested service to functional resources in the terminals based on the exchanged terminal capabilities, for consuming the requested group service by means of the functional resources.

In one embodiment, Peer-to-Peer communication is used between the terminals in the group. In another embodiment, a group invitation is sent to the terminals after the group discovery process. In further embodiments, a basic group template is created and stored as a list of the discovered users and their terminal capabilities and functional resources. The basic group template can also be distributed to the other terminals in the group.

A group service may also be defined, and an activity scheme can be created and stored for the group service specifying actions and functions necessary for consuming that service. The activity scheme may be defined as a macro or script that can be executed whenever the service is requested.

The activity scheme is stored in the terminal appointed as application master and may also be distributed to the other terminals in the group.

Assigning the functions and actions required for the requested service may include identifying these functions and actions, and matching them with the exchanged terminal capabilities. An activity scheme could then be retrieved or created for the identified functions and activities, and the activity scheme can be applied as a filter on the exchanged terminal capabilities, thereby filling the activity scheme with the appointed terminals to create an assigned activity scheme. In yet another embodiment, activity orders corresponding to the functions and activities are also sent to the respective appointed terminals of users.

In further embodiments, the current traffic or connection characteristics include at least one of: bandwidth, geographic position and communication price. A user terminal in the group is selected as application master for a group service, to control that service when activated and consumed. The initiating user terminal may be selected as the application master by default, or the application master could be selected by using a master selection algorithm. Different user terminals could also be selected as application masters for different group services. A new application master is also preferably selected if the original master leaves the group.

Further preferred features and benefits of the present invention will become apparent from the detailed description below.

BRIEF DESCRIPTION OF THE DRAWINGS

The present invention will now be described in more detail by means of preferred embodiments and with reference to the accompanying drawings, in which.

DETAILED DESCRIPTION

Briefly described, the present invention provides a solution that enables usage or consumption of user services by a group comprising a plurality of terminal users, without requiring a central server such as the above-mentioned PGM server. This solution can be wholly based on Peer-to-Peer (P2P) communication between the terminals in the user group for establishing and managing the group.

By discovering and sharing different capabilities or functional resources in the different user terminals, user services can be consumed in a more optimised manner, e.g. with improved performance, added value and/or at lower prices, and the user experience can thereby be generally enhanced. This solution thus provides a group management system of pooled capabilities and functional resources in the participating terminals, as well as a shared functionality for group service management. Thereby, the users in the group are also able to freely select or compose user services based on their collective terminal capabilities and resources, without relying on an operator-controlled central group management server.

In a "provisioning" first phase, the group is formed by means of a discovery mechanism and terminal capabilities are exchanged within the group in order to establish the shared group management functionality and knowledge of the different capabilities and functional resources in the participating terminals. The group service management functions can also be distributed over the different user terminals in the group, depending on their respective capabilities and/or connections.

In a "run-time" second phase, a user service is activated and consumed by the users such that one or more terminals within the group are selected according to a dynamic resource allocation scheme to perform specific functions required for the service. For example, multimedia content could be downloaded from a content server such that different terminals receive different parts of the content over different access channels to increase the total bandwidth and download speed, and/or to reduce the communication costs. The content parts are then assembled at one or more of the terminals in the group to be played out and enjoyed by the group members. In another example, a series of photographs may be taken by a terminal equipped with a camera, and the resulting pictures are then conveyed to another terminal that transmits the pictures to a receiving party over a suitable connection.

Figure 1:
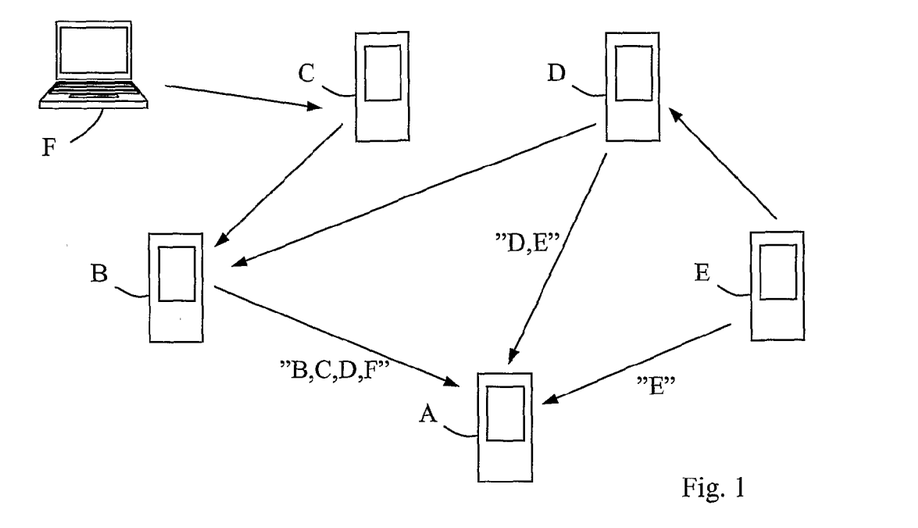
FIG. 1 is a schematic block diagram illustrating a procedure in a communication network for enabling user services in a group of users, according to one embodiment.

FIG. 1 illustrates schematically how a plurality of users A-F can establish a user group by P2P communication. In this description, the term "user" will generally represent a person, or a software-based user agent or the like, and a used terminal. It should be noted that the terminals involved in the group could be any type of communication terminals, such as mobile or fixed phones and computers, and the present invention is not limited in this respect. In this example, users A-E operate different mobile phones whereas user F operates a laptop computer. It is assumed that the terminals A-F can have different capabilities and/or connections.

The P2P communication can be conducted by using any type of communication links between the terminals A-F, such as Bluetooth, WLAN (Wireless Local Access Network), cellular 3G or GSM/EDGE, WIMAX, etc. The communication is Peer-to-Peer at the service level, in the sense that no intermediate server or the like is involved in the group management messaging. Nevertheless, the exchanged messages could be routed over various transport and access networks or conveyed directly over short-range radio or other communications links, such as Bluetooth links, which is outside the scope of this invention.

One of the users A being interested in forming a group, may initiate a group discovery process during which the users A-F detect each other's presence. For example, the Bluetooth technology could be used for terminal discovery, although the present invention is not limited thereto. The group could basically also be created by the users themselves "out-ofband" without using their terminals, e.g. by using a web page or the like for registration, as long as the resulting group is finally registered in the terminals.

In this process, user A may discover all other users B-F directly, or some of the discovered users could also discover other users and acknowledge their presence indirectly to user A. As illustrated by the arrows in FIG. 1, user C discovers user F, user D discovers user E, and user B discovers users C and D. User C, having discovered user F, also acknowledges the presence of user F as well to user B, and so forth. User A discovers users B, D and E, and users B and D also acknowledge the presence of users C, D, F and E, respectively, as shown in the figure. Thereby, user A has discovered all other users B-F either directly or indirectly.

In order to create the group, the initiating user A sends out an invitation to the other users B-F to join the group. The other users B-F can then respond by either accept or decline, and those who accept will receive information on the composition of the group such that the group is "mirrored" in their terminals, which will be described further below. In this process, all users may send accepts (or declines) to all other users, or to the inviting user A only.

Different capabilities in the user's terminals can now be pooled and utilised to manage various group services. These capabilities may be available only to users that have been authorised to gain access to them. For example, the group could be configured as a closed group with a membership list, or as an open group for anyone who might join it. The process of authorisation and authentication, if necessary, is however outside the scope of the present invention.

Figure 2:
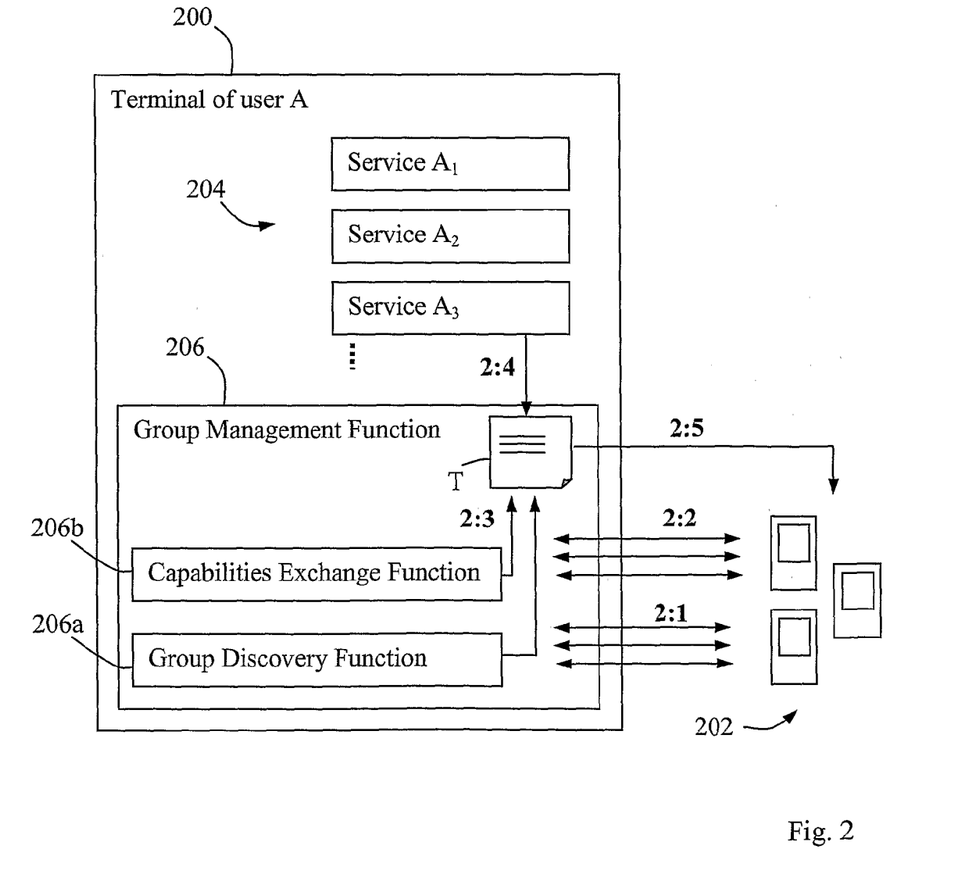
FIG. 2 is a schematic block diagram illustrating a user terminal adapted to enable user services for a group of users during a provisioning phase, according to another embodiment.

FIG. 2 illustrates the terminal 200 of a group initiating user A in more detail, when communicating with other users 202 in the group during the above-described provisioning phase, in accordance with one possible embodiment. The terminal 200 comprises a plurality of service applications 204 denoted $A_1, A_2, A_3, \ldots$, effectively representing the capabilities or functional resources of the terminal. It is assumed that the terminals of the other users 202 as well comprise various service applications representative of their respective terminal capabilities.

Terminal 200 further comprises a group management functional unit 206 adapted to handle the group and communicate with its participants, i.e. the users 202. The group management function 206 in turn comprises a group discovery functional unit 206a and a capabilities exchange functional unit 206b. It is further assumed that the other terminals also comprise a similar or corresponding group management function. A procedure of creating and handling a user group is illustrated in the figure as schematic steps 2:1-2:5.

In a first shown step 2:1, the group discovery function 206a in terminal 200 executes the above-described group discovery process by detecting the presence of the other users 202 and creating the user group, e.g. in the manner described for FIG. 1 above. When receiving some suitable user input, the group discovery function 206a also sends invitations to any of the other terminals 202 to join the group.

Thereafter, the capabilities exchange function 206b exchanges terminal capabilities with the other users 202, in a next step 2:2. In this description, the term "terminal capabilities" generally represents any functional resources, equipment information and available services, applications or data programs, as well as the current traffic or connection characteristics of the terminal (e.g. bandwidth, geographic position and price) which may also be exchanged as valid information. For example, one terminal may have a current cellular connection only allowing for a low bitrate due to high traffic load in a serving cell, whereas another terminal may currently have a "high speed" WLAN connection.

Using the terminal capability information, any forthcoming communication can be optimised with respect to quality, speed and costs when consuming a group service. The terminal capabilities of the participating users' terminals 200, 202 can also be referred to as "functional resources" which are basically available to the group for consuming different user services.

A "basic group template T" is then formed, in a following step 2:3, from the information on the group obtained by the group discovery and capabilities exchange functions 206a and 206b, respectively. The basic group template T thus includes a list of the discovered users 202 and their terminal capabilities or functional resources. Further, the capabilities of terminal A represented by the service applications 204 are also added to the basic group template T, as shown by a further step 2:4.

Finally, the basic group template T is sent to each of the participating users 202, in a last shown step 2:5. Thereby, each user terminal 200, 202 in the group has knowledge of all participants and their functional resources (based on the terminal capabilities) available to the group by means of the basic group template T. The basic group template T could also be called a "distributed group service management registry", and the terminals 200, 202 in the group are nodes in a P2P infrastructure of the distributed registry which thus holds information on available resources and services in the group. The template T may be formed as a DHT (Distributed Hash Table) e.g. defined in an XML (eXtensible Mark-up language) template.

It is now possible to define different group service applications and assign resources in the terminals to the different functions and actions required when consuming the respective group services. A user terminal may also be selected as "application master" for each defined group service, to control the service when activated and consumed. The user terminal having created the group may be selected as application master by default. Alternatively, a master selection algorithm can be used, e.g. a predefined selection scheme or the like. Different user terminals may also be selected as application masters for different group service applications. Further, it may be necessary to select a new application master if the original master leaves the group for one reason or another.

When defining a particular user service, all required functions and actions can be identified and a scheme or diagram with various steps and actions is then created for the service, hereafter called "activity scheme". The activity scheme thus specifies all activities necessary for consuming the service, which may be defined as a macro or script that can be executed when the service is requested. It is also possible to freely compose a new service upon request by creating a corresponding activity scheme which is then applied in order to assign terminal resources. An exemplary activity scheme for a user service could be: 1) "take picture", 2) "attach text to picture", and 3) "send picture with attached text to receiving party".

When that service is requested by any of the users, resources in the different user terminals can be allocated dynamically by applying the created activity scheme on the basic group template T to match the required functions and actions to different terminals, and then assigning these functions to specific terminals. This process is performed by the application master which sends corresponding activity orders to the appointed terminals. Following the example above, the resulting resource allocation could be: 1) "terminal B takes picture", 2) "terminal F adds text", and 3) "terminal A sends picture with text to receiving party".

The present solution can also introduce resource redundancy since the terminals in the group may have more capabilities than needed, such that the same functional resource is duplicated in a plurality of terminals. Thereby, it is possible to apply a load balancing scheme to distribute the functions on plural terminals, e.g. by downloading separate parts of a large media file in different terminals. For example, if 10 users have access to links with a bandwidth of 1 Mbps (Megabits per second) each, they could be pooled to form a combined 10 Mbps link.

Some metrics to consider when assigning terminal resources to the different steps and functions in the activity scheme depending on their capabilities may include, without limitation: 1) encoding/decoding capability, 2) encryption/decryption capability, 3) playout capability and quality, 4) receiving capability, 5) available bandwidth, 6) communication rates/prices, 7) current position, 8) buffering capacity, 9) screen properties such as size and resolution, 10) computational capacity, 11) power capacity, etc.

Figure 3:
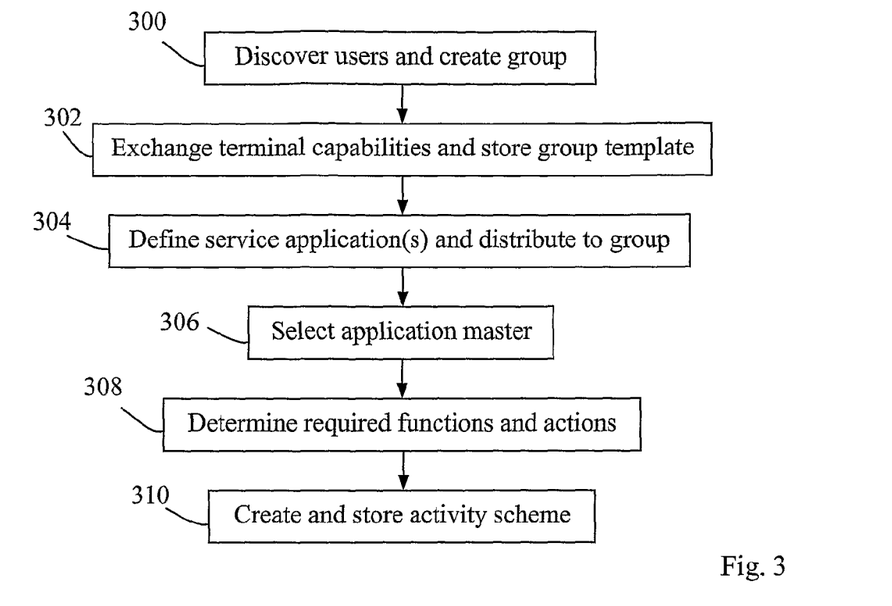
FIG. 3 is a flow chart illustrating a procedure for enabling user services for a group of users during a provisioning phase, according to yet another embodiment.

FIG. 3 is a flow chart with steps in an exemplary procedure for enabling user services for a group of terminal users, as executed by an initiating terminal (e.g. terminal A in the example above) basically during the provisioning phase described above. In a first step 300, a plurality of terminal users are discovered and invited to create a user group, e.g. basically as described for step 2:1 in FIG. 2. In the discovery process, the users may advertise themselves to the others ("I am here") by announcing an identity or alias, and a personal profile e.g. including interests, preferences, age, occupation and other characteristics.

In a next step 302, terminal capabilities are exchanged with the other user terminals in the group, and a basic group template can then also be stored and distributed to the others as described for steps 2:3, 2:4 and 2:5 in FIG. 2. Exchanging terminal capabilities basically means that the user terminals advertise their functional resources to the others ("what I can do"), which can also be referred to as a "resource discovery" process. As mentioned above, the terminal capabilities may include functional resources as well as connection characteristics.

As the basic group template is created and distributed to the other users in the group, a common distributed service discovery mechanism is achieved where the group members can activate and/or create various group services based on the capability information given in the group template. Each user can thus keep group service information relevant to only those groups he/she is a member of.

One or more group service applications can then be defined in a further step 304, which are also distributed to the other terminals in the group. An application master is also selected for the defined group service(s), in a next step 306, to control the service when activated and consumed. As mentioned above, the initiating user may be selected as the master by default, or a predefined master selection algorithm may be used. It should be noted that the application master is not necessarily a master to the other terminals in the sense of a conventional master-slave relationship. In an exemplary implementation in an ad-hoc network, the application master will basically act as control point for the group services.

Different functions and actions required when consuming the respective group service(s), are then determined in a next step 308. Finally, in a last shown step 310, an activity scheme or the like can be created and stored for each service specifying all steps and functions necessary for consuming that service. The activity scheme may be defined as a macro or script that can be executed whenever the service is requested.

The created activity scheme is stored at least in the terminal appointed as application master. The activity scheme may optionally also be distributed to the other terminals in the group, e.g. if redundancy is desirable. Thereby, any user in the group can initiate and control the service by assigning actions and functions in the activity scheme to suitable terminals according to their current capabilities. Hence, steps 308 and 310 are basically performed to configure the service application(s) defined in step 304 in the group.

Figure 4:
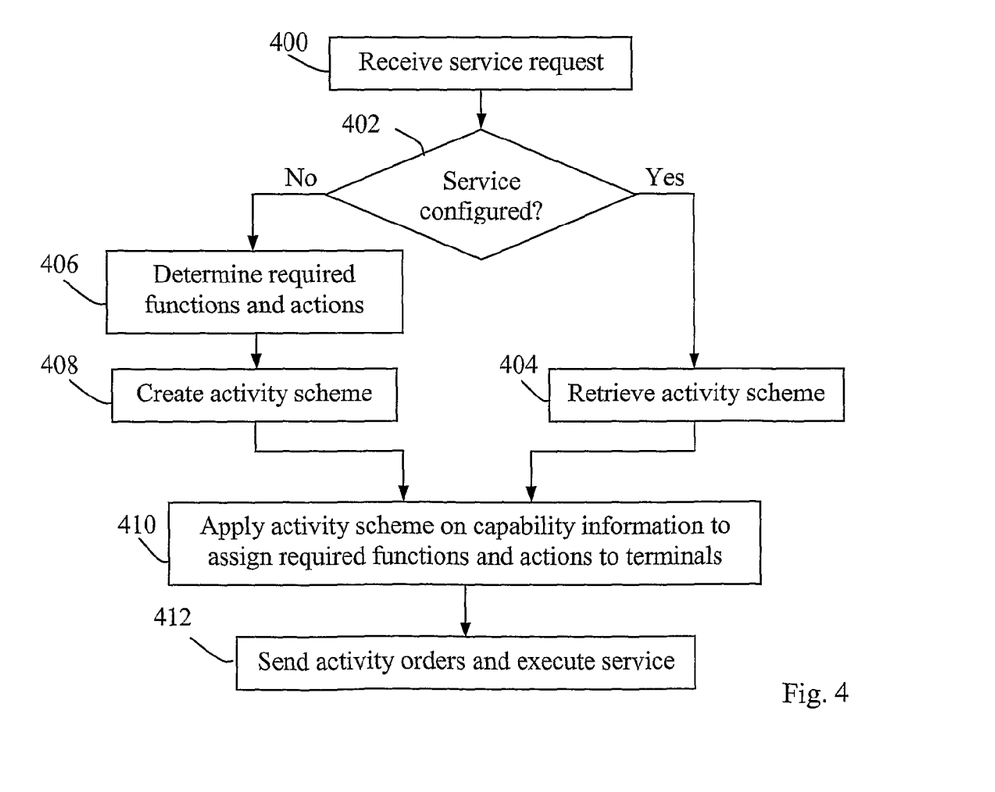
FIG. 4 is a flow chart illustrating a procedure for enabling user services in a group of users during a run-time phase, according to yet another embodiment.

FIG. 4 is a flow chart with steps in an exemplary procedure for consuming a user service in a group of terminal users established basically according to FIG. 3. The procedure is executed by a terminal appointed as application master for that service, during the run-time phase described above.

In a first step 400, a service request is received from a user in the group, which could be any user in the group including the user of the application master terminal. The requested service may have been configured previously in the group according to steps 308, 310, or it may be a newly composed service. It is therefore determined in a next step 402 whether the requested service has been configured in the group or not. If so, a corresponding activity scheme has been stored in the application master terminal which is retrieved in a step 404. On the other hand, if the requested service has not been configured in the group previously, all functions and actions required for consuming the requested service are determined in an alternative step 406, and a corresponding activity scheme is created in a following step 408.

The activity scheme, either retrieved in step 404 or created in step 408, is then applied on the capability information in the group template to assign any required functions and actions in the scheme to specific terminals in the group, in a further step 410. Applying the activity scheme includes matching the required functions and actions to the capabilities of the different terminals according to the basic group template. Corresponding activity orders are also sent to the appointed terminals in a last shown step 412, and the requested service is finally executed and consumed. In this way, the functional resources in the different user terminals are allocated dynamically for the requested service, based on their capabilities.

Figure 5:
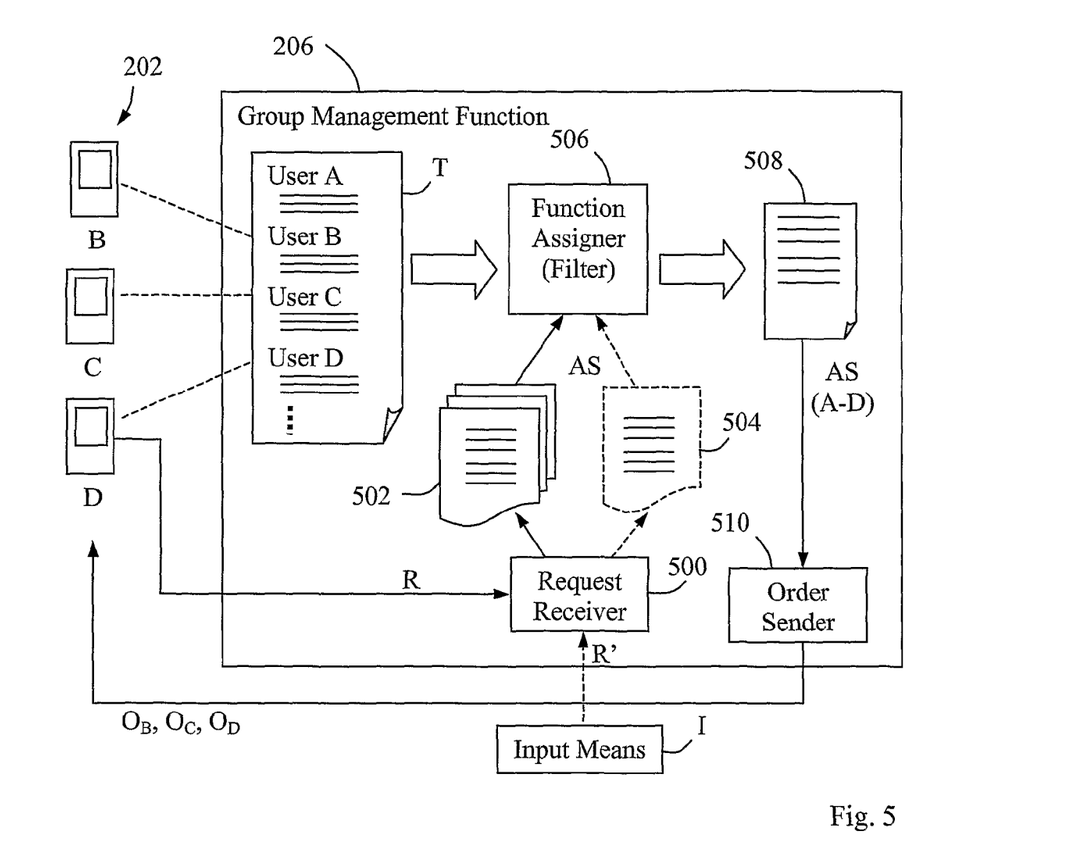
FIG. 5 is a schematic block diagram illustrating a user terminal adapted to enable user services in a group of users during a run-time phase, according to yet another embodiment.

FIG. 5 is a logic block diagram illustrating further functional units in the group management function unit 206 in the terminal 200 of user A in FIG. 2 during the above-described run-time phase, when applying an activity scheme for executing the service in a user group comprising user A and users B-D 202. The terminal 200 of user A has been selected as application master for a requested group service according to the above. In group management function unit 206, a basic group template T has been created and stored basically according to steps 300 and 302 of FIG. 3, the template T also being shown in FIG. 2. Thus, template T contains information on the users A, B, C and D regarding their terminal capabilities and current connections, as indicated by dashed lines.

In this example, user D sends a service request R to user A which is received by a request receiving function 500. Alternatively, a service request may also be made by user A such that an internal request message is received from a used input means I at the terminal, as shown by the dashed arrow R'.

It is then determined whether the requested service has been configured previously or not as the request receiving function 500 identifies functions and actions required for the service, which are compared with a set of predefined activity schemes 502 that has been stored in group management function unit 206 basically according to step 310 of FIG. 3. If no corresponding predefined activity scheme is found, a new activity scheme 504 can be created for the requested service from the identified functions and actions (dashed arrows). If a predefined activity scheme is found in the set 502 that corresponds to the requested service, it is simply retrieved (full arrows) for use.

A function assigner 506 then applies the created or retrieved activity scheme AS by matching the required functions and actions therein to the terminal capabilities of users A-D according to the basic group template T. Thereby, the function assigner 506 applies the activity scheme AS basically as a filter on the information in template T, as illustrated by the fat arrows, to determine which terminals in the group are most suitable for undertaking the different functions and actions required for the service, which are then assigned to these terminals.

As a result, function assigner 506 basically "fills" the activity scheme AS with the appointed terminals to create an assigned activity scheme AS (A-D) 508. The assigned activity scheme 508 is then conveyed to an order sending function unit 510 which finally sends corresponding activity orders $O_B$, $O_C$, $O_D$ to the respective appointed terminals of users B, C and D. It should be noted that certain required functions and actions may also be assigned to terminal 500 of user A, which is the selected application master.

In the solution described for FIG. 5, it is possible for user A to freely compose a new service by creating a new activity scheme 504, e.g. using the input means I. The activity scheme 504 is then basically filled with appointed terminals by the function assigner 506, based on the capabilities listed in the basic group template, to create an assigned activity scheme from which corresponding activity orders are created and sent to the appointed terminals.

Figure 6:
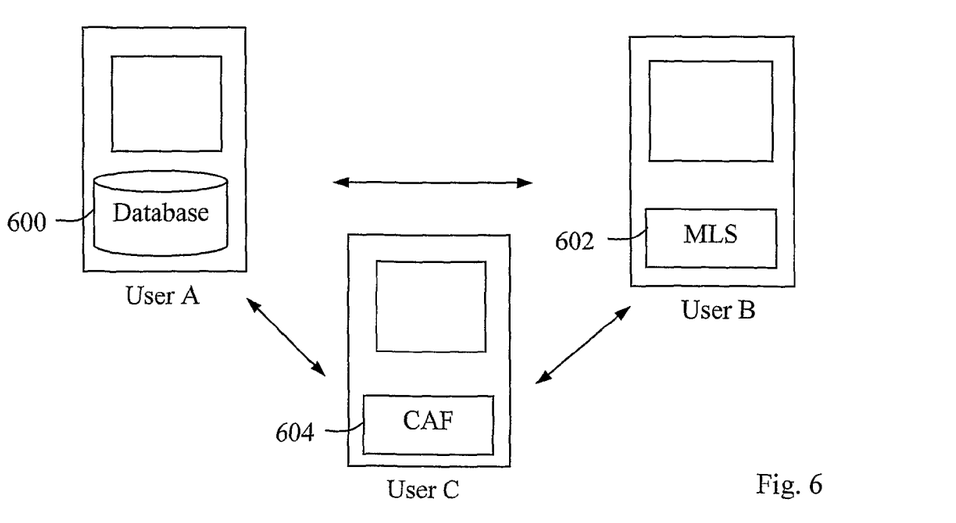
FIG. 6 is a schematic scenario illustrating how a group management system can be distributed over plural terminals, according to yet another embodiment.

It is also possible to distribute the above-described group management functions of terminal 200 over plural terminals in the group. For example, as shown in FIG. 6, the terminal of a user A could be responsible for a database 600 used for holding a basic group template, the terminal of a user B could be responsible for a machine learning system MLS 602 used for group discovery and capability exchange, and the terminal of a user C could be responsible for a context aggregation function CAF 604 used for creating or selecting activity schemes.

Figure 7:
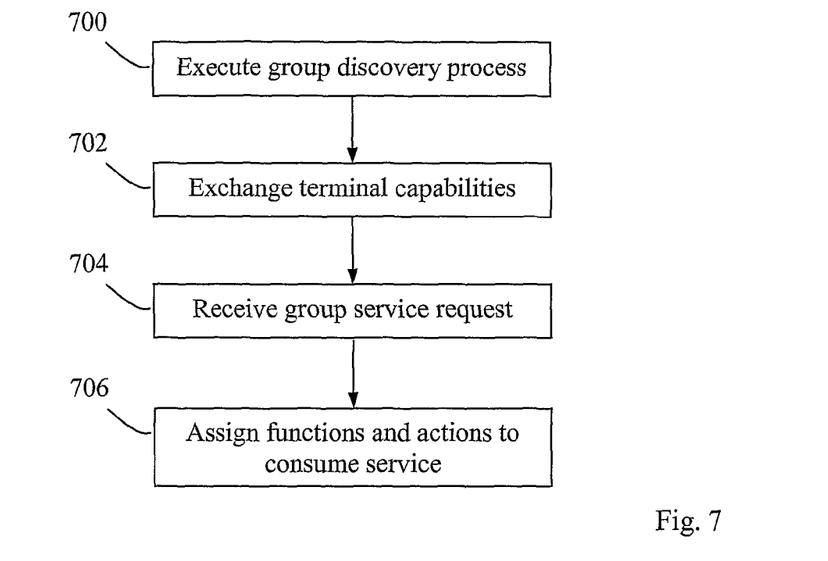
FIG. 7 is a flow chart illustrating some basic steps in a procedure for enabling user services for a group of users, according to yet another embodiment.

A method of enabling user services in a communication network with a plurality of terminal users, will now be described with reference to a flow chart depicted in FIG. 7. The process includes steps 700-706 executed by a group management function unit in an initiating user terminal, such as terminal 200 in FIGS. 2 and 5.

In a first step 700, a group discovery process is executed with the terminals of the users in order to form a user group. In a next step 702, terminal capabilities are exchanged with the terminals in order to create a basic group template as described above. The exchanged terminal capabilities include at least one of: functional resources, available services, equipment information, applications or data programs, and current traffic or connection characteristics.

In a following step 704, a group service request is received from a user in the group, e.g. the user of the initiating terminal. In response thereto, functions and actions required for the requested service are assigned to functional resources in the terminals in the group based on the exchanged terminal capabilities, in a final step 706, and the requested group service can then be consumed by means of the functional resources in the appointed terminals.

An arrangement in an initiating user terminal for enabling user services in a communication network with a plurality of terminal users, will now be described with reference to a block diagram shown in FIG. 8. A group management function unit 800 in the initiating user terminal includes a group discovery unit 800a adapted to execute a group discovery process with the users' terminals to form a user group.

The group management function unit 800 further includes a capabilities exchange unit 800b adapted to exchange terminal capabilities with the terminals. The terminal capabilities includes at least one of: functional resources, available services, equipment information, applications or data programs, and current traffic or connection characteristics.

The group management function unit 800 further includes a request receiving unit 800c adapted to receive a group service request from a user in the group, and a function assigning unit 800d adapted to assign functions and actions required for the requested service to functional resources in the terminals based on the exchanged terminal capabilities. The group management function unit 800 finally includes an order sending unit 800e adapted to send activity orders corresponding to the functions and activities to the respective appointed terminals. The requested group service can then be consumed by means of the functional resources.

Figure 8:
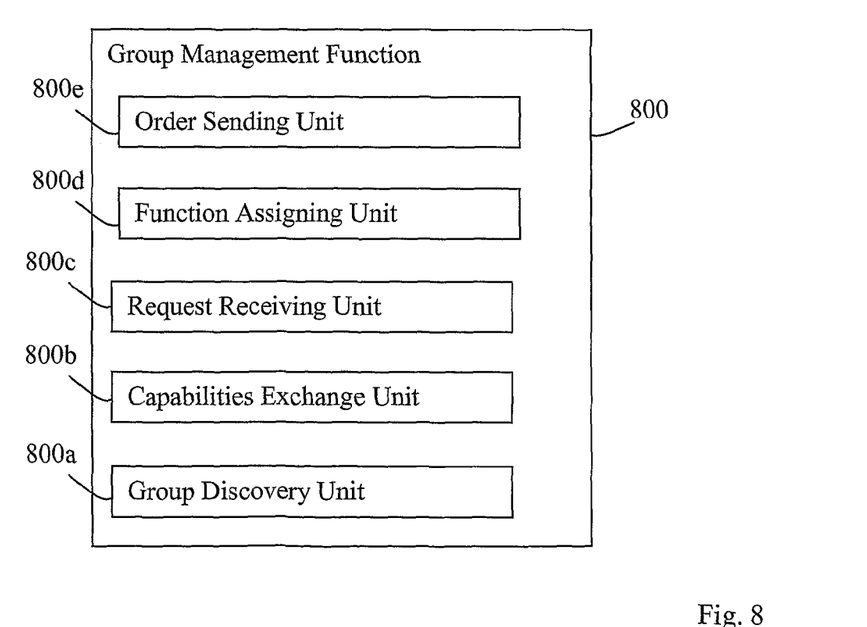
FIG. 8 is a schematic block diagram illustrating a group management functional unit in a group service initiating terminal, according to yet another embodiment.

It should be noted that FIG. 8 merely illustrates the various functional units 800a-e in a logical sense, while the skilled person is free to implement these functions in practice using any suitable software and hardware means. Thus, the present invention is generally not limited to the shown structure of the group management function unit 800.

By using the invention, e.g. according to the above-described embodiments, a group management system can be dynamically implemented in a group comprised of any number and types of communication terminals, without involving a central operator-controlled group management server. The group management system can thus be initiated and wholly controlled by the group members, and new services can also be created and consumed as desired by the group members. The problem of involving plural operators when the group includes users across different operator environments can also be avoided.

Further, this solution also allows for multiple optimisation possibilities, e.g. with respect to user experience and costs. The users in the group are no longer limited by their chosen terminals and/or connections when consuming user services, since the resources and capabilities of all terminals in the group can be utilised in an optimised manner. Moreover, redundancy can be introduced in the group management system to enable load balancing and to ensure backup functionality even when a user resigns or disappears from the group.

Without limitation, the allocation of terminal resources may thus be based on capabilities, latency, bandwidth, position and costs. One terminal having relatively great resources and capabilities could be assigned a higher level of participation in a group service, as compared to another terminal with more limited resources and capabilities.

While the invention has been described with reference to specific exemplary embodiments, the description is generally only intended to illustrate the inventive concept and should not be taken as limiting the scope of the invention. The present invention is defined by the appended claims.

The invention claimed is:

1. A method of enabling user services in a communication network with a plurality of user terminals, comprising the following steps executed by an initiating user terminal:

an initiating phase comprising
executing a group discovery process to discover the plurality of user terminals in order to form a user group, exchanging terminal capabilities with the plurality of user terminals, the terminal capabilities including at least one of functional resources, available services, equipment information, applications, data programs, current traffic characteristics, and connection characteristics, creating a basic group template and storing the basic group template as a list of discovered user terminals and their terminal capabilities and functional resources, after exchanging terminal capabilities, defining a group service, creating an activity scheme for the group service that specifies actions and functions necessary for supporting provision of the group service, and storing the activity scheme, a run-time phase, which is executed subsequent to the initiating phase, comprising receiving a group service request from one of the plurality of user terminals in the user group, determining that the group service request corresponds with the defined group service, identifying, using the basic group template, a subset of the plurality of user terminals having functional resources to support the requested group service as defined in the activity scheme for the group service, wherein the subset includes at least two user terminals of the plurality of user terminals, assigning functions and actions defined in the activity scheme for the requested group service to the subset of the plurality of user terminals based on the exchanged terminal capabilities, and sending activity orders corresponding to the assigned functions and actions to the subset of the plurality of user terminals, wherein the activity orders instruct each of the user terminals in the subset of the plurality of user terminals how to support provision of the requested group service, wherein the initiating phase is performed prior to and independent of receipt of the group service request during the run-time phase.

2. The method of claim 1, wherein Peer-to-Peer communication is used between the plurality of user terminals in the user group.

3. The method of claim 1, further comprising sending a group invitation to the plurality of user terminals after the group discovery process.

4. The method of claim 1, further comprising distributing the basic group template to other user terminals in the user group.

5. The method of claim 1, wherein the activity scheme a macro or script executable whenever the group service is requested.

6. The method of claim 1, wherein the activity scheme is stored in a user terminal appointed as application master.

7. The method of claim 6, wherein the activity scheme is also distributed to other user terminals in the user group.

8. The method of claim 1, wherein the assigning step includes identifying functions and actions required for the requested group service, and matching the identified functions and actions with exchanged terminal capabilities.

9. The method of claim 8, further comprising creating or retrieving an activity scheme for identified functions, and applying the activity scheme as a filter on the exchanged terminal capabilities, thereby filling the activity scheme with respective user terminals and creating an assigned activity scheme.

10. The method of claim 1, wherein either current traffic characteristics or connection characteristics include at least one of bandwidth, geographic position, and communication price.

11. The method of claim 1, further comprising selecting a user terminal in the user group as application master for a group service, wherein the selected user terminal controls the respective group service when activated and consumed.

12. The method of claim 11, wherein the initiating user terminal is selected as the application master by default, or the application master is selected according to a master selection algorithm.

13. The method of claim 11, wherein a new application master is selected if the user terminal selected as application master leaves the user group.

14. A method of enabling user services in a communication network with a plurality of user terminals, comprising the following steps executed by an initiating user terminal:

an initiating phase comprising executing a group discovery process on the user terminals in order to form a user group, exchanging terminal capabilities with the user terminals, the terminal capabilities including at least one of functional resources, available services, equipment information, applications, data programs, current traffic characteristics, and connection characteristics, creating a basic group template and storing the basic group template as a list of discovered user terminals and their terminal capabilities and functional resources, after exchanging terminal capabilities, defining a group service, creating an activity scheme for the group service that specifies actions and functions necessary for supporting provision of the group service, and storing the activity scheme, a run-time phase, which is executed subsequent to the initiating phase, comprising receiving a group service request from a user terminal in the user group, determining that the group service request corresponds with the defined group service, assigning, using the basic group template, functions and actions defined by the activity scheme for the requested group service to functional resources in the user terminals based on the exchanged terminal capabilities, for consuming the requested group service through the functional resources, sending activity orders corresponding to the assigned functions and actions to the user terminals for dynamically instructing each respective user terminal how to consume the requested group service, and selecting a user terminal in the user group as application master for a group service, wherein the selected user terminal controls the respective group service when activated and consumed, wherein different user terminals are selected as application masters for different group services wherein the initiating phase is performed prior to and independent of receipt of the group service request during the run-time phase.

15. A method, comprising:

an initiating phase comprising participating, by a first user terminal of a plurality of user terminals, in a group discovery process to form a user group comprising the plurality of user terminals;

participating, by the first terminal, in an exchange of terminal capabilities with the plurality of user terminals, the terminal capabilities including at least one of functional resources, available services, equipment information, applications, data programs, current traffic characteristics, and connection characteristics, and creating and storing a basic group template as a list of discovered user terminals and their terminal capabilities and functional resources;

after exchanging terminal capabilities, defining a group service, creating an activity scheme for the group service that specifies actions and functions necessary for supporting provision of the group service, and storing the activity scheme, determining, by the first user terminal, that the first user terminal is an application master for a specific group service, wherein at least one additional user terminal of the plurality of terminals is capable of acting as the application master for the specific group service, a run-time phase, which is executed subsequent to the initiating phase, comprising receiving, by the first user terminal, a group service request for the specific group service;

determining that the group service request corresponds with the defined group service, assigning, by the first user terminal using the basic group template, functions and actions defined by the activity scheme for the requested specific group service to functional resources of a subset of the plurality of user terminals based on the exchanged terminal capabilities, wherein the subset includes at least two user terminals of the plurality of user terminals, and sending activity orders corresponding to the assigned functions and actions to the subset of the plurality of user terminals for supporting provision of the requested group service, wherein the initiating phase is performed prior to and independent of receipt of the group service request during the run-time phase.

16. The method of claim 15, wherein Peer-to-Peer communication is used between the plurality of user terminals in the user group.

17. The method of claim 15, further comprising sending a group invitation to the plurality of user terminals after the group discovery process.

18. The method of claim 15, further comprising distributing the basic group template to other user terminals in the user group.

19. The method of claim 15, wherein the activity scheme a macro or script executable whenever the group service is requested.

20. The method of claim 19, wherein the activity scheme is stored in the first terminal appointed as application master.

21. The method of claim 20, wherein the activity scheme is also distributed to other user terminals in the user group.

22. The method of claim 15, wherein the assigning step includes identifying functions and actions required for the requested group service, and matching the identified functions and actions with exchanged terminal capabilities, wherein the method further comprises creating or retrieving an activity scheme for identified functions, and applying the activity scheme as a filter on the exchanged terminal capabilities, thereby filling the activity scheme with respective user terminals and creating an assigned activity scheme.

* * * * *